UNITED STATES PATENT OFFICE.

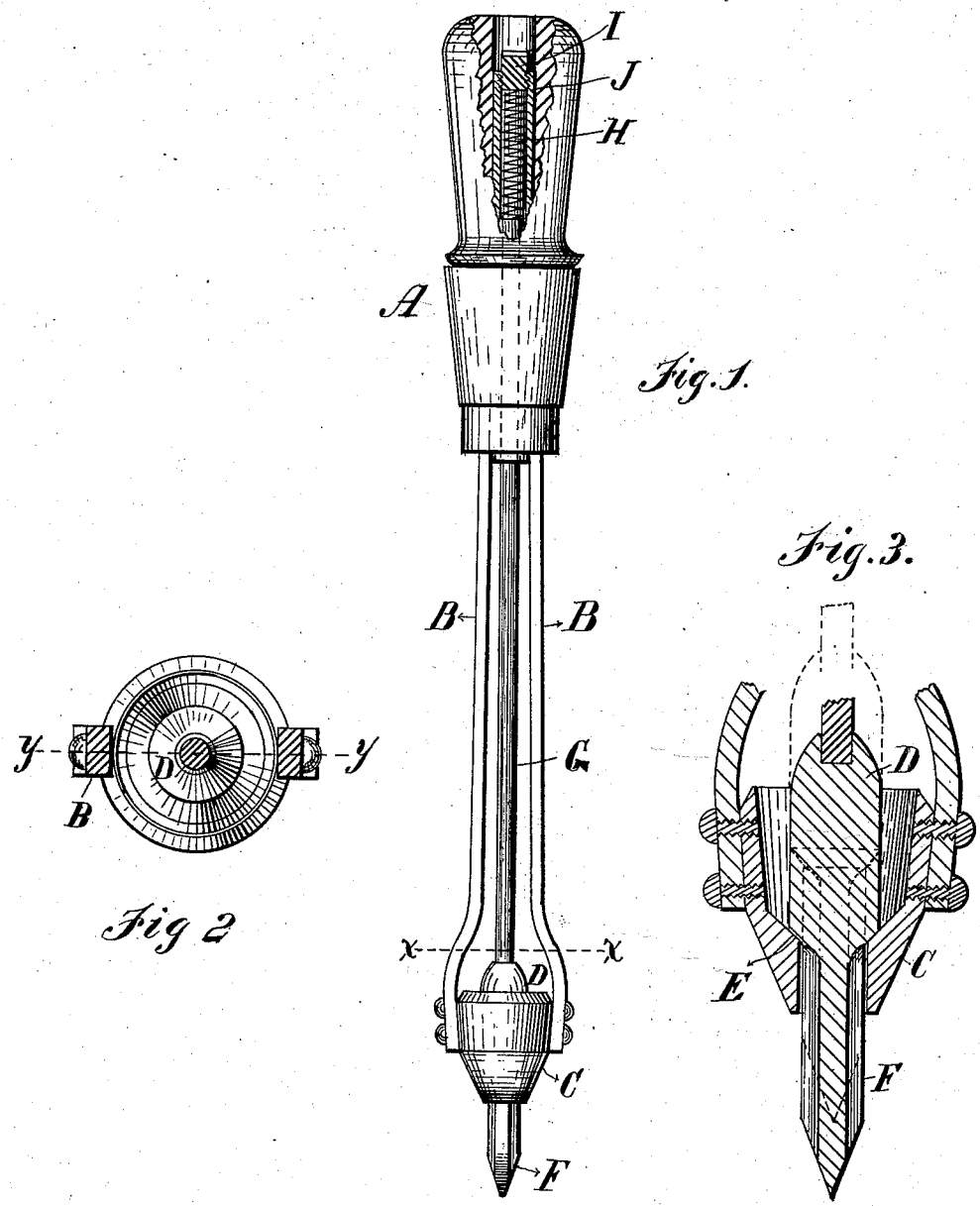

ARTHUR HARRIS, OF CHICAGO, ILLINOIS, ASSIGNOR OF ONE-HALF HIS RIGHT TO GEORGE M. CLARK, OF SAME PLACE.

IMPROVEMENT IN SOLDERING-TOOLS.

Specification forming part of Letters Patent No. 194,519, dated August 28, 1877; application filed May 31, 1877.

*To all whom it may concern:*

Be it known that I, ARTHUR HARRIS, of Chicago, in the county of Cook and State of Illinois, have invented a new and useful Improvement in a Soldering-Tool, which is fully described in the following specification, reference being had to the accompanying drawings, in which—

Figure 1 represents a side view of my soldering-tool; Fig. 2, a transverse sectional view taken at the line $x\ x$, Fig. 1; and Fig. 3, a vertical central sectional view, taken at the line $y\ y$, Fig. 2.

The object of my invention is to make an implement or tool for applying molten solder to the joints to be soldered, and more especially when that application is to be made in the interior of a can or other similar vessel.

My invention consists in the devices and combination of devices hereinafter specified.

In the accompanying drawings, A represents an ordinarily-turned wooden handle in convenient form for handling the tool. B represents two metal rods attached to the handle, and also to the metal cup C. The cup C has a conical-shaped bottom, or is otherwise so constructed as to make a seat for the movable iron D, which has a shoulder, E, that fits the bottom of the cup, so as to make a sufficiently-tight joint to hold the molten solder. The iron D has a projecting point, F, which projects through the bottom of the cup C, as clearly shown in Figs. 1 and 3 of the drawings. G is a rod, firmly secured to the iron D, and projects up into the handle A of the tool, and has above it a spring, H, which presses the iron D down upon the seat in the bottom of the cup, so that it will hold molten solder. I is a screw-nut, and J a tube, with a screw-thread in its upper end. The spring H is placed in the tube J, and the screw-nut I screwed to the end of the tube to hold the spring in place.

The operation of my soldering-tool is as follows: An operator dips the cup C into a pot of molten solder, thereby filling it. He then passes the tool into the can or other vessel to be soldered, placing the point F against the point where he wishes to flow the solder, and presses down sufficiently hard to raise the iron D from its seat in the cup sufficiently to allow the molten solder to flow through to the point to be soldered, and by moving the point F along the joint as the solder flows from the cup, a complete distribution and flow of the solder are effected throughout the entire length of the joint to be soldered.

I find it preferable to make the cup C large enough to hold just the quantity of solder required in soldering a single joint, especially when a large number of cans or other similar vessels, all of the same size, are being manufactured. This enables an unskilled person to use just the same amount of solder in soldering every can.

My soldering-tool is especially adapted for applying solder to the interior of deep and narrow cans or vessels, and is designed more especially to apply molten solder to joints that are heated preparatory to the application thereto of molten solder.

Having thus fully described the nature and operation of my invention, what I claim, and desire to secure by Letters Patent, is—

1. The combination, in a soldering-tool, of the cup C and the iron D, provided with the projecting point F, for the purpose of holding the molten solder, and controlling and regulating its flow and distribution in the seam or joint to be soldered, substantially as specified.

2. The combination, in a soldering-tool, of the cup C, iron D, rod G, and spring H, whereby the iron is firmly pressed upon the seat in the cup to hold the solder until the tension of the spring is overcome by the operator, substantially as specified.

ARTHUR HARRIS.

Witnesses:
L. A. BUNTING,
W. C. CORLIES.